(12) United States Patent
Liu et al.

(10) Patent No.: US 10,013,067 B2
(45) Date of Patent: Jul. 3, 2018

(54) GESTURE CONTROL METHOD, APPARATUS AND SYSTEM

(71) Applicant: ZTE Corporation, Shenzhen, Guangdong (CN)

(72) Inventors: Haijun Liu, Shenzhen (CN); Lidong Lin, Shenzhen (CN); Yunjun Zhou, Shenzhen (CN); Zheng Huang, Shenzhen (CN); Chuanyang Miao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 86 days.

(21) Appl. No.: 14/784,435

(22) PCT Filed: Sep. 17, 2013

(86) PCT No.: PCT/CN2013/083690
§ 371 (c)(1),
(2) Date: Nov. 20, 2015

(87) PCT Pub. No.: WO2014/169566
PCT Pub. Date: Oct. 23, 2014

(65) Prior Publication Data
US 2016/0266653 A1 Sep. 15, 2016

(30) Foreign Application Priority Data
Apr. 15, 2013 (CN) .......................... 2013 1 0130673

(51) Int. Cl.
*G06F 3/01* (2006.01)
*G06F 3/03* (2006.01)
(Continued)

(52) U.S. Cl.
CPC ............ *G06F 3/017* (2013.01); *G06F 3/0304* (2013.01); *G06K 9/00335* (2013.01);
(Continued)

(58) Field of Classification Search
None
See application file for complete search history.

(56) References Cited

U.S. PATENT DOCUMENTS

| | | | |
|---|---|---|---|
| 2006/0125968 A1* | 6/2006 | Yokozawa | G06F 3/033 348/734 |
| 2008/0088602 A1* | 4/2008 | Hotelling | G06F 1/1626 345/173 |

(Continued)

FOREIGN PATENT DOCUMENTS

| | | |
|---|---|---|
| CN | 102778954 A | 11/2012 |
| CN | 102810023 A | 12/2012 |

(Continued)

OTHER PUBLICATIONS

International Search Report in international application No. PCT/CN2013/083690, dated Jan. 16, 2014, 2 pgs.

(Continued)

*Primary Examiner* — Seokyun Moon
(74) *Attorney, Agent, or Firm* — Cooper Legal Group, LLC

(57) ABSTRACT

Disclosed are a gesture control method, device and system, during gesture control, a gesture control center identifies a gesture for a controlled device, and transmits manipulation information corresponding to an identified gesture to the controlled device; and the controlled device performs a corresponding operation according to received manipulation information. By means of gesture control techniques according to the disclosure, it is possible to ensure that gesture manipulation of multiple devices can be implemented by only one gesture identification device such as the gesture control center, and thus a unified gesture control is implemented, thereby avoiding possible malfunctions that may be generated during gesture control of different devices and also avoiding a waste of resources; furthermore, it is pos- (Continued)

sible to provide a convenient manipulation way to devices that don't support manipulation through gesture identification and save costs for those devices to be added with a gesture identification component, and all above benefits improve effectively user satisfaction.

8 Claims, 4 Drawing Sheets

(51) Int. Cl.
*G06K 9/00* (2006.01)
*H04N 21/436* (2011.01)
*G06F 3/0346* (2013.01)

(52) U.S. Cl.
CPC ............ *G06F 3/011* (2013.01); *G06F 3/0346* (2013.01); *G08C 2201/32* (2013.01); *H04N 21/43615* (2013.01)

(56) References Cited

U.S. PATENT DOCUMENTS

| | | | | |
|---|---|---|---|---|
| 2009/0303176 | A1* | 12/2009 | Chen | G06F 3/017 345/156 |
| 2010/0079374 | A1* | 4/2010 | Cortenraad | G06F 3/0346 345/158 |
| 2012/0068857 | A1* | 3/2012 | Rothkopf | G08C 19/28 340/870.07 |
| 2012/0236037 | A1* | 9/2012 | Lessing | G06F 3/017 345/661 |
| 2013/0144629 | A1* | 6/2013 | Johnston | G06F 3/167 704/275 |
| 2013/0290911 | A1* | 10/2013 | Praphul | G06F 3/017 715/863 |

FOREIGN PATENT DOCUMENTS

| | | |
|---|---|---|
| CN | 102915111 A | 2/2013 |
| CN | 103329066 A | 9/2013 |
| EP | 1184982 A1 | 3/2002 |
| JP | 2012048560 A | 3/2012 |
| JP | 2014507714 A | 3/2014 |
| KR | 20140014129 A | 2/2014 |
| WO | 2012099584 A1 | 7/2012 |

OTHER PUBLICATIONS

English Translation of the Written Opinion of the International Search Authority in international application No. PCT/CN2013/083690, dated Jan. 16, 2014, 13 pgs.

Supplementary European Search Report in European application No. 13882158.2 dated Apr. 21, 2016, 8 pgs.

* cited by examiner

GESTURE CONTROL METHOD, APPARATUS AND SYSTEM

TECHNICAL FIELD

The disclosure relates to the field of communication, and in particular to a gesture control method, apparatus and system.

BACKGROUND

With the development of digital multimedia and networks, entertainment experiences in daily life are enriched. People can control playing of a device through a remote controller or a gesture, such as controlling it to switch to a previous channel program or a next channel program.

For controlling multiple devices, generally each device has a respective remote controller to perform control, but these remote controllers are not universal, and most of these controllers, such as a traditional TV or sound box, cannot be networked. There may be some network enabled controllers, for example, a device (e.g., a mobile phone, a pad) having computing and networking capabilities can be loaded with software supporting intercommunication protocols to control another equipment.

The above device control method is apparently not so convenient, people may need to select one remote controller corresponding to a specific device from a pile of remote controllers and change remote controllers from time to time to control different devices, or the device can be controlled through operations on a pad or a mobile phone by people familiar with basic operations on computers, or a single device is controlled by simple gestures. Obviously, to control different devices, people often need to learn how to use different manipulation tools, resulting in tedious operations. People prefer to use an easier and more natural operation way to control a device, based on such demands, gesture control advents; gesture control is currently a relatively new control way, and when gesture control is performed, a camera on a device monitors and identifies gestures and the device is controlled according to control commands corresponding to identified gestures.

At present, to implement gesture control, a controlled device is required to be equipped with a camera configured to implement visual identification. In practical application environments, there may be cases where multiple gesture control enabled devices have their respective cameras and gesture identification software, which results in not only a waste of resources but also possible malfunctions during gesture identification, e.g., a gesture instruction for a TV is taken for a manipulation of a set-top box by the latter. In addition, there are some devices not equipped with cameras and gesture identification software, and thus gesture control cannot be implemented thereon.

SUMMARY

In view of the above, embodiments of the disclosure are intended to provide a gesture control method, apparatus and system so as to implement unified gesture control.

To this end, the technical solutions of embodiments of the disclosure are implemented as follows.

A gesture control method including:

a gesture control center identifies a gesture for a controlled device, and transmits manipulation information corresponding to an identified gesture to the controlled device; and the controlled device performs a corresponding operation according to received manipulation information.

In an embodiment, before the gesture for the controlled device is identified, the method may further include: the gesture control center identifies a controlled device within its visible range.

In an embodiment, when identifying the controlled device within its visible range, the gesture control center may identify and record at least one of a device identifier, a device address and a device position of the controlled device.

In an embodiment, when identifying the gesture for the controlled device, the gesture control center may identify a manipulation command corresponding to the gesture and a controlled device to which the gesture directs.

In an embodiment, the step that the gesture control center identifies a controlled device to which the gesture directs may include:

calculation is performed using an angle between the gesture and a video collection module of the gesture control center; or after measurement of distances between the gesture, the controlled device and the gesture control center, calculation is performed using trigonometric formulas.

In an embodiment, the step that the gesture control center transmits the manipulation information may include: a manipulation command or gesture feature data is transmitted; and/or when the manipulation information received by the controlled device is the manipulation command, an operation corresponding to the manipulation instruction is performed; when the manipulation information received by the controlled device is the gesture feature data, the received gesture feature data is analyzed to obtain a manipulation command, and an operation corresponding to the obtained manipulation command is performed.

In an embodiment, the method may further include: the controlled device establishes a connection with the gesture control center, and the gesture control center implements, based on the connection, manipulation of the controlled device through a session using a message.

A gesture control apparatus including a video collection module, an identification module and a control module, wherein the video collection module is configured to capture a gesture for a controlled device;

wherein the identification module is configured to identify the gesture; and wherein the control module is configured to transmit manipulation information corresponding to an identified gesture to the controlled device.

In an embodiment, the apparatus may further include a distance measuring module configured to identify, along with the video collection module, a controlled device within a visible range, and calculate a distance between the apparatus and the controlled device.

In an embodiment, the apparatus may further include a data storage module configured to, upon identification of a controlled device within the visible range, record at least one of a device identifier, a device address and a device position of an identified controlled device.

In an embodiment, the identification module may include an image identification module and a gesture identification module, wherein the image identification module is configured to identify a manipulation command corresponding to a gesture; and wherein the gesture identification module is configured to identify a controlled device to which the gesture directs.

In an embodiment, the gesture identification module may be configured to, when identifying the controlled device to which the gesture directs, calculate using an angle between the gesture and the video collection module; or after measurement of distances between the gesture, the controlled device and the apparatus, calculate using trigonometric formulas.

In an embodiment, the control module may be configured to, when transmitting the manipulation information, transmit a manipulation command or gesture feature data.

In an embodiment, the apparatus may include a network service module configured to establish a connection with the controlled device, and implement, based on the connection, manipulation of the controlled device through a session using a message.

A gesture control system including a gesture control center and a controlled device, wherein the gesture control center is configured to identify a gesture for the controlled device, and transmit manipulation information corresponding to an identified gesture to the controlled device; and wherein the controlled device is configured to perform a corresponding operation according to received manipulation information.

In an embodiment, the gesture control center may be configured to, when transmitting the manipulation information, transmit a manipulation command or gesture feature data; and/or the controlled device may be configured to, when the received manipulation information is the manipulation command, perform an operation corresponding to the manipulation instruction, and when the received manipulation information is the gesture feature data, analyze the received gesture feature data to obtain a manipulation command, and perform an operation corresponding to the obtained manipulation command.

In an embodiment, the controlled device may be configured to, when performing the corresponding operation according to the received manipulation information, establish a connection with the gesture control center, based on which manipulation of the controlled device is implemented through a session using a message.

By means of gesture control techniques according to embodiments of the disclosure, it is possible to ensure that gesture manipulation of multiple devices can be implemented by only one gesture identification device such as the gesture control center, and thus a unified gesture control is implemented, thereby avoiding possible malfunctions that may be generated during gesture control of different devices and also avoiding a waste of resources; furthermore, it is possible to provide a convenient manipulation way to devices that don't support manipulation through gesture identification and save costs for those devices to be added with a gesture identification component, and all above benefits improve effectively user satisfaction.

DETAILED DESCRIPTION

The technical problem to be solved by embodiments of the disclosure is to implement control of controlled devices using an apparatus capable of controlling controlled devices in a unified way.

The above apparatus capable of controlling controlled devices in a unified way is a gesture control center having gesture identification capability and being network-enabled, and it can identify a gesture and a controlled device to which the gesture directs, and convert the gesture to a manipulation command or store a gesture feature; the gesture control center can further interconnect with the controlled device and transmit, to the controlled device, a message containing the manipulation command or gesture feature.

The gesture control center can implement operations containing following steps:

step 1, the gesture control center identifies a controlled device within its visible range;

step 2, the gesture control center identifies a gesture;

step 3, the gesture control center transmits manipulation information to a controlled device to which the gesture directs; and step 4 the controlled device performs a corresponding operation according to received manipulation information.

Further, in step 1, when identifying the controlled device within its visible range, the gesture control center can identify and record at least one of a device identifier, a device address and a device position of the controlled device.

Further, in step 2, when identifying the gesture for the controlled device, the gesture control center can identify a manipulation command corresponding to the gesture and a controlled device to which the gesture directs, e.g., by analyzing motional feature of the gesture.

Further, in step 3, the gesture control center can transmit a manipulation command or gesture feature data. The controlled device can further analyze the transmitted gesture feature data to obtain a corresponding manipulation command.

Further, in step 4, the controlled device establishes a connection with the gesture control center, and the gesture control center implements, based on the connection, manipulation of the controlled device through a session using a message.

Further, the manipulation command and the gesture feature data can be a protocol instruction, i.e., a protocol message and corresponding parameters specified in a certain application protocol.

The present invention will be elaborated below with reference to accompanying drawings in conjunction with embodiments.

Figure 1:
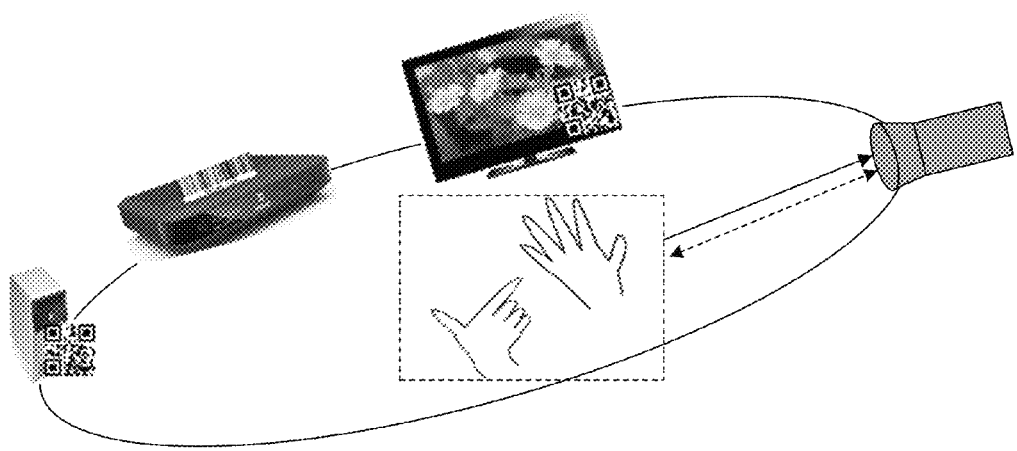
FIG. 1 is a schematic diagram of a gesture control system according to an embodiment of the disclosure.

Referring to FIG. 1, it shows an application scenario in which devices and mutual relationship therebetween are included.

FIG. 1 shows, from left to right, four devices, i.e., a home storage server, a DVD player, a TV and a gesture control center, and positioning relationship between all these devices ensures there are no shelters between the gesture control center and any other devices, in this way, light emitted from the gesture control center can directly impinge on a device without any obstacle. However, the light emitted from the gesture control center is not limited to that emitted at a unique angle.

All the above four devices are provided with a network interface (e.g., a network interface supporting IEEE 802.11b/g/n or a network interface supporting IEEE 802.3) so that they can be connected to a communication network such as an IP network. Each device includes a communication module, having service capability, configured to discover other devices and be discovered by other devices, connect with other devices, transmit and receive messages to/from other devices, and process and forward manipulation commands. The above service capability can be implemented using existing Universal Plug and Play (UPnP) techniques, multicast Domain Name System (mDNS) and DNS Service Discovery (DNS-SD) techniques, and can be used in an IP network to respond to a query and provide function scheduling according to a predefined message format in a unicast, multicast query way. For example, UPnP techniques specify how a media display device (e.g., TV) and a server (e.g., DVD player and home storage server) respond to queries and what functions they can provide for scheduling.

The gesture control center further includes a video collection module (e.g., camera, and a camera is taken as an example hereinafter) having image and video collection capability and a distance measuring module. The gesture control center further include an identification module, a data storage module, a control module and a network service module. The camera of the gesture control center can implement below functions: taking photos of a device within its visible range and identifying information contained in a tag attached on the device; capturing gestures of a user and identifying corresponding operation target, operation command or gesture feature data. The distance measuring module is similar to a hand-held laser/infrared distance finder that calculates the distance between the gesture control center and a controlled device based on propagation and reflection of light such as infrared. Typically, it is applicable to select a distance measuring module having an accuracy of about 2 mm. The gesture control center can transmit manipulation information corresponding to an identified gesture to the controlled device so that the controlled device performs a corresponding operation according to received manipulation information. The identification module can include an image identification module and a gesture identification module to implement identification of an image and a gesture, respectively.

Figure 2:
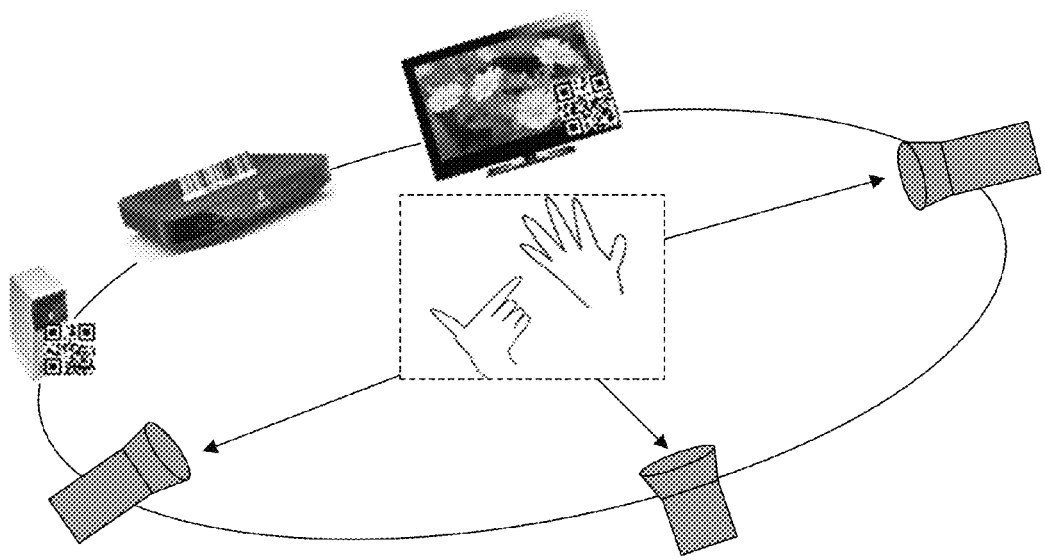
FIG. 2 is a schematic diagram of a gesture control system according to another embodiment of the disclosure.

The gesture control center can identify a device within its visible range, and the identification method includes: the camera, distance measuring module collects images while rotating within a 3D space, searches for a predefined tag pattern in collected images and analyzes a sought out tag pattern. As shown in FIG. 2, the camera of the gesture control center collects an image by taking a photo, and there are three controlled device in the image, i.e., the TV, the DVD player and the home storage server, each with a tag such as a bar code or 2D code attached to, printed on or embedded in it. After analyzing the image, the image identification module of the gesture control center recognizes that there are several tags in the image, identifies each of the tags and store identified tag information, then performs distance measurement on a controlled device where each tag is located, and stores the measured distances together with respective tag information.

Similar to FIG. 1, there are also three controlled devices in FIG. 2, i.e., the TV, the DVD player and the home storage server; additionally, FIG. 2 includes three cameras having image and video collection capability, which belong to the gesture control center. The gesture control center in FIG. 2 doesn't have a distance measuring function. The positioning relationship between all devices in FIG. 2 ensures there are no shelters between the gesture control center and any other devices, in other words, light emitted from the gesture control center can directly impinge on each controlled device without any obstacle.

The mutual spatial positioning relationship between the three cameras is predefined, in other words, the gesture control center records distances between three cameras and angles between respective directions of the three cameras. Typically, the three cameras are not located in a same straight line, and respective directions of the three cameras are not parallel to one another or the angles therebetween are no more than 90 degree. The three cameras can communicate with one another, exchange collected images and videos with one another or transmit respectively collected images and videos to a specified device.

Based on the above positioning relationship (distances between three cameras and angles between respective directions of the three cameras), after each of the three cameras collects relative angles (e.g., relative to the horizontal plane) of a controlled device and gesture falling within its collection range, it is thus possible to calculate positions of the controlled device and the gesture and the direction of the gesture through coordinate transformation and trigonometric formulas.

Figure 3:
FIG. 3 is a schematic diagram of a bar code used during implementation of gesture control according to an embodiment of the disclosure.

The aforementioned bar code is as shown in FIG. 3, the information on the bar code tag is "dvdplayer-192.1.1.1" representing that the controlled device corresponding to the bar code tag is a DVD player with an IP address of 192.1.1.1. The bar code tag can be attached to, printed on or embedded in the DVD player.

Figure 4:
FIG. 4 is a schematic diagram of a two-dimensional (2D) code used during implementation of gesture control according to an embodiment of the disclosure.

The aforementioned 2D code is as shown in FIG. 4, the information on the 2D code tag is "tv-192.1.1.2" representing that the controlled device corresponding to the 2D code tag is a TV with an IP address of 192.1.1.2. The 2D code tag can be attached to, printed on or embedded in the TV.

Besides the above bar code and 2D code, the tag information may further contain more content, such as a simplified name or self-defined name of the controlled device. For example, texts are directly labeled on a controlled device so that the gesture control center identifies the controlled device according to the texts labeled on the controlled device.

To identify a controlled device, a gesture and a controlled device to which the gesture directs, the identification module of the gesture control center can establish a three-dimensional (3D) coordinates, and the gesture control center or a self-defined spatial position point can be selected as the origin of the 3D coordinates, and should be stored in the gesture control center. In case as shown in FIG. 2, one of the three cameras can be selected as the origin of the 3D coordinates. The identification module within the gesture control center takes charge of measuring, labeling, and calculating position of a controlled device, and measuring, labeling and calculating a controlled device to which a gesture directs.

Figure 5:
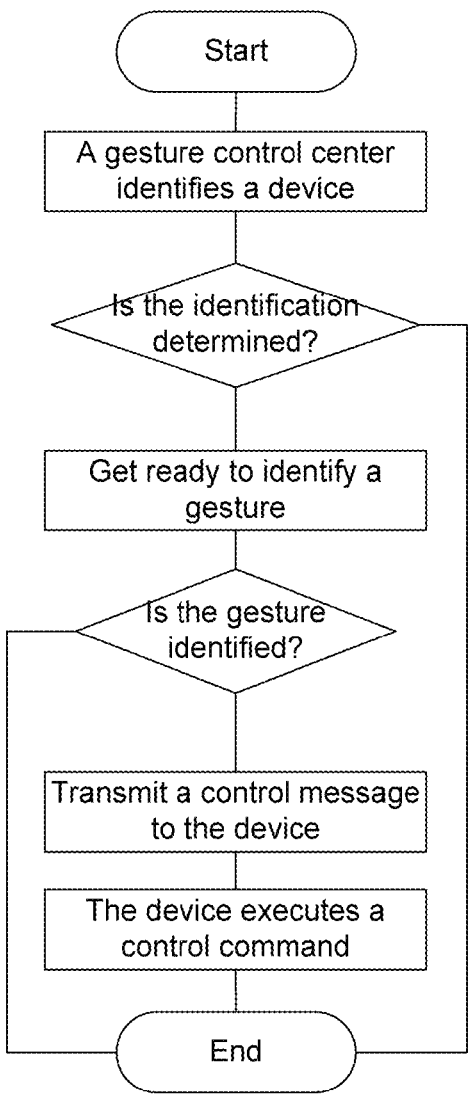
FIG. 5 is a flow chart showing gesture control according to an embodiment of the disclosure.

The operation process of the gesture control center will be described below with reference to FIG. 1 and FIG. 5.

1. The gesture control center identifies a controlled device.

The gesture control center, upon starting or regularly, collects an image within its visible range through a camera, and then identifies a collected image to check whether there is a identifiable controlled device. If the specific identification method relates to the bar code and the 2D code as shown in FIG. 2 and FIG. 3, it can be determined first whether there is a bar code or 2D code in the collected image, and after the determination of a region where the bar code or 2D code is located, information represented by the bar code or the 2D code is identified.

2. The gesture control center confirms with the identified controlled device.

After identifying the controlled device, the gesture control center can interact with the controlled device through a network, e.g., by searching for the controlled device using an existing UPnP protocol or DNS-SD, so as to determine information such as address and functions of the controlled device.

3. The gesture control center gets ready to identify a gesture.

A video collection module (e.g., camera) of the gesture control center monitors images in within a video range and collects a gesture.

The identification of a gesture can be implemented by Histogram method or Hidden Markov model. Firstly, a gesture of a user falls into a capture range of the camera so that the camera can generate a gesture video and transmits it to the identification module, the identification module identifies the position of the hand making the gesture from gesture images of the received gesture video through analysis of the color, profile and structured light, detects and segments a gesture object, extracts a gesture feature and tracks movement of the gesture; then processes a finger direction and movement direction sequence to finally identify completely the gesture; then the identified gesture is for example compared with a predefined gesture space to determine the users intention of the gesture.

The above identification of the gesture further includes identification of a controlled device to which the gesture directs.

The method for determining a controlled device to which a gesture directs according the embodiment is a calculation based on an angle between the gesture and the controlled device. For example, when a user is taken as the origin, there is an angle between the controlled device and the gesture of the user. When the gesture control center identifies the gesture, it can identify an angle and distance between an extension line of the gesture of the user and each controlled device.

Specifically, the gesture control center can first identify an arm, and takes the elbow as the origin. Taking a scenario where there is not any controlled device as an example, if the palm moves from left to right, the angle varies from 0° to 360°, and if the palm moves from top to bottom, the angle varies from 0° to 180°. Here what the identification module needs to calculate is an angle between a line from the elbow to each controlled device and a line from the elbow to the palm (i.e., the arm) in a triangle consisting of each controlled device, the palm and the elbow. A smaller angle between the arm and a controlled device represents that the gesture is more likely to direct to the controlled device. Specific meanings represented by angles within different ranges are as follows.

0°-90°: representing that the gesture is likely to direct to a controlled device which the user expects to manipulate; if the angle is 0°, it is asserted that the gesture directs to the specific controlled device;

90° 180°: representing that the gesture is most likely not to direct to a controlled device which the user expects to manipulate;

After calculation of the angle between each controlled device and the gesture, the gesture control center selects a controlled device corresponding to the smallest angle, and determines the controlled device as the controlled device which the user expects to manipulate.

In practical applications, it is also possible to calculate lengths of below three lines after the measurement of distances between the gesture, the controlled device and the gesture controlled center: in a triangle consisting of the controlled device, the palm and the elbow, a line from the elbow to the controlled device, a line from the elbow to the palm (arm) and a line from the palm to the controlled device. Regarding the calculation of lengths, the identification module can directly calculate lengths of the above three lines, or calculate according to a certain proportion after measurement of a reference distance. Then the above angels are calculated according to trigonometric formulas for determination.

Figure 8:
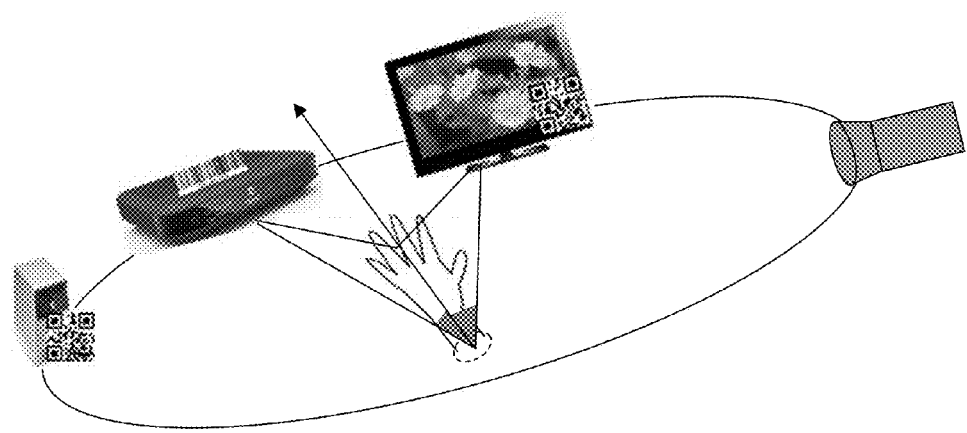
FIG. 8 is a schematic diagram showing the principle of determination of a controlled device to which a gesture directs.

FIG. 8 shows how to determine a controlled device to which a gesture directs: a line from the palm to the arm directs to a direction, and an angle forms between the line from the palm to the arm and a line from the elbow to the device; as shown in FIG. 8, it illustrates an angle between a line from the elbow to a DVD player and a line from the palm to the arm, and also an angle between a line from the elbow to a TV and a line from the palm to the arm. The gesture control center, through comparison of the two angles, determines that the user expects to control the DVD player through the gesture. FIG. 8 also illustrates the aforementioned (two) triangles, and as another method to calculate angles, angles can be calculated based on each of the two triangles using trigonometric formulas. The method shown in FIG. 8 can be applied to gesture control of more controlled devices.

In practical applications, there may be problems regarding selection of a center point of a measurement object (e.g., palm, arm, controlled device), which can be resolved by mathematical operations.

4. After identifying a manipulation command corresponding to the gesture, the gesture control center transmits a command message to the controlled device.

The gesture control center defines and stores correspondences between gestures and command messages. After determining through identification the manipulation command and the controlled device corresponding to the manipulation command, the gesture control center can transmit the manipulation command to the controlled device through a network connection with the controlled device.

The manipulation command can be universal instructions, e.g., playback or power off, and can also be device specific instructions, such as switching channel or volume up, and can further be protocol instructions, i.e., instructions specified in an application protocol, for example media content sharing in protocols such as UPnP.

5. The controlled device receiving the manipulation command executes the manipulation command.

The controlled device receives the manipulation command through the network connection and executes it. As described in step 4, the controlled device, according to specific content of the command, executes an internal program, or communicates with other devices to implement the command collaboratively.

If what contained in the instruction message is feature data of the gesture, the controlled device analyzes and calculates the feature data to obtain and execute a corresponding instruction.

Figure 6:
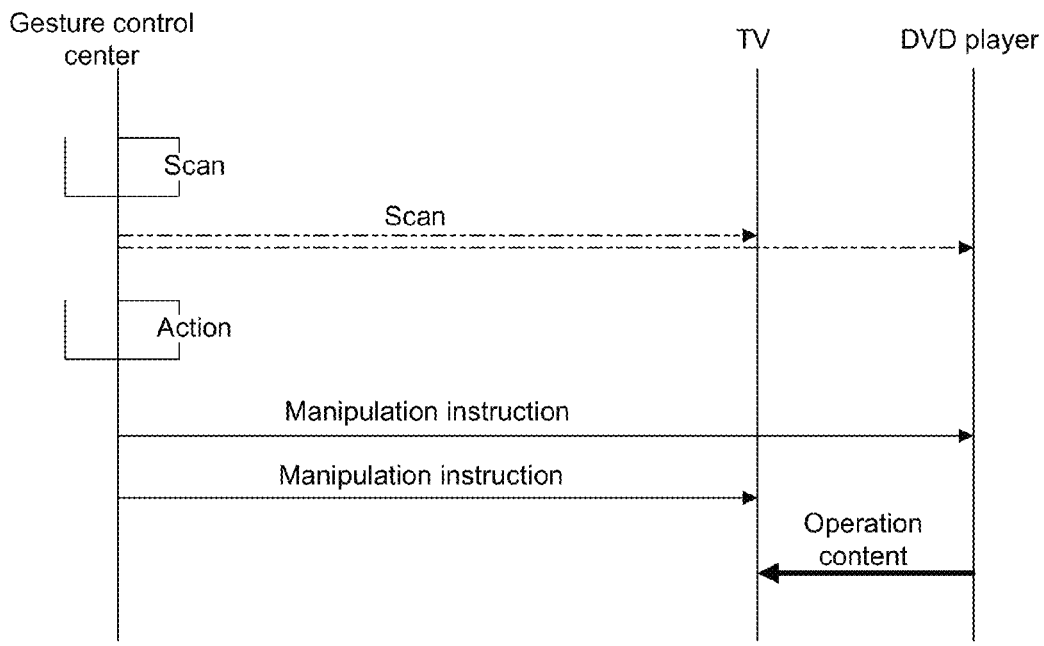
FIG. 6 is a schematic diagram showing messages flowing between a gesture control center and a controlled device according to an embodiment of the disclosure.

To sum up, in a message flow of interaction between the gesture control center and the controlled device as shown in FIG. 6, the operation of the gesture control center includes two main steps: implementation of visual discovery of the controlled device, and transmission of the manipulation command.

Specifically, firstly, the gesture control center scans for a controlled device within its visible range, and identifies and stores a tag of the scanned controlled device. At this point, it is not required to use a network.

After identifying the controlled device, the gesture control center can interact with the controlled device through a network, e.g, by searching for the controlled device using an existing UPnP protocol or DNS-SD, so as to determine information such as address and functions of the controlled device.

Next, when identifying the gesture, the gesture control center analyzes the gesture to find out a gesture object and intension, and maps the intension to a manipulation command or gesture feature data.

Then, the gesture control center transmits the manipulation command to a controlled device to which the gesture directs. It is required at this point that there is a network connection between the gesture control center and the controlled device to which the gesture directs, and a network message can be transmitted using a protocol message such as a UPnP protocol message.

If the above gesture is a predefined collaborative gesture, e.g., consecutive gesture operations performed on a TV and DVD player, the gesture control center identifies respective gestures and transmits respective manipulation commands to respective controlled devices.

Finally, the controlled device receiving the manipulation command implements an operation corresponding to the manipulation command.

The manipulation command can be universal instructions, e.g., playback or power off, and can also be device specific instructions, such as switching channel or volume up, and can further be protocol instructions, i.e., instructions specified in an application protocol, for example media content sharing in protocols such as UPnP, playback of content by a DVD player on a TV.

It should be noted that the controlled device is not limited to aforementioned TV, player and storage server, it can also be a computer, stereo, sound box, projector, set-top box, or even an auto, machine tool, ship and the like. Furthermore, the controlled device can be an existing device equipped with a camera such that gesture control can be implemented independently based on visual identification, and can also be other devices not equipped with a camera.

In addition, the camera of the gesture control center can be of various spec, for example, it can be of a fixed focal length or variable focal length with a rotation space of all directions or only a left-to-right rotation space. The distance measuring module can measure distance using infrared or using light of other wavebands. The aforementioned three cameras can be used to measure distance, and more cameras can be used to measure distance (e.g., weighting adjustment and the like).

Moreover, the aforementioned communication module can be a transceiver; the distance measuring module can be a distance finder; the identification module can be a single chip microcomputer, a processor and the like; the gesture identification module can be a single chip microcomputer and processor that can identify a gesture; the data storage module can be a memory; the control module can be an integrated circuit that can process data and perform control, such as a CPU; and the network service module can be a network server.

Figure 7:
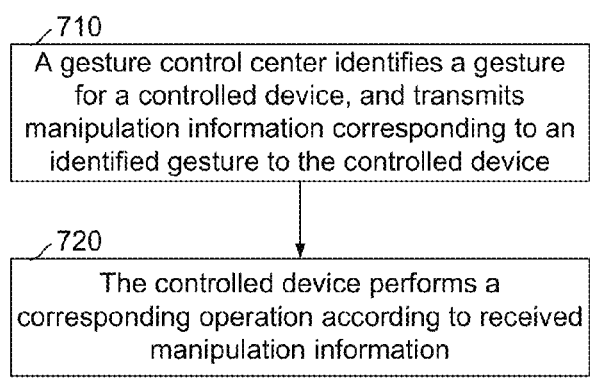
FIG. 7 is a simplified flow chart showing gesture control according to an embodiment of the disclosure.

It can be seen from the above description that gesture control techniques according to embodiments of the disclosure can be represented by the flow as shown in FIG. 7, and the flow includes the following steps:

step 710, a gesture control center identifies a gesture for a controlled device and a controlled device to which the gesture directs; and step 720, the gesture control center transmit manipulation information to the controlled device to which the gesture directs, and the controlled device performs a corresponding operation according to received manipulation information.

To sum up, by means of gesture control techniques according to embodiments of the disclosure, it is possible to ensure that gesture manipulation of multiple devices can be implemented by only one gesture identification device such as the gesture control center, and thus a unified gesture control is implemented, thereby avoiding possible malfunctions that may be generated during gesture control of different devices and also avoiding a waste of resources; furthermore, it is possible to provide a convenient manipulation way to devices that don't support manipulation through gesture identification and save costs for those devices to be added with a gesture identification component, and all above benefits improve effectively user satisfaction.

What described are merely preferable embodiments of the disclosure, and are not intended to limit the disclosure.

The invention claimed is:

1. A gesture control method, comprising:
identifying, by a gesture control center, a controlled device within a visible range of the gesture control center,
  wherein when identifying the controlled device within the visible range of the gesture control center, the gesture control center identifies and records a device position of the controlled device;
identifying, by the gesture control center, a gesture for the controlled device after identifying the controlled device within the visible range of the gesture control center, and transmitting manipulation information corresponding to the gesture to the controlled device,
  wherein when identifying the gesture for the controlled device, the gesture control center identifies a manipulation command corresponding to the gesture and a controlled device to which the gesture directs,
  wherein identifying, by the gesture control center, the controlled device to which the gesture directs comprises:
    calculating the direction of the gesture using an angle between the gesture and a video collection module of the gesture control center; or after measurement of distances between the gesture, the controlled device and the gesture control center, calculating the direction of the gesture using trigonometric formulas,
wherein after measurement of distances between the gesture, the controlled device and the gesture control center, calculating the direction of the gesture using trigonometric formulas further comprises:
calculating an angle between a line from a palm to an elbow and a line from the palm to each controlled device; and
selecting a controlled device about which the angle is smallest as the controlled device to which the gesture directs; and
performing, by the controlled device, a corresponding operation according to the manipulation information.

2. The method according to claim 1, wherein when identifying the controlled device within the visible range of the gesture control center, the gesture control center identifies and records at least one of a device identifier or a device address of the controlled device.

3. The method according to claim 1, wherein
the transmitting, by the gesture control center, the manipulation information comprises transmitting the manipulation command or gesture feature data; and/or
when the manipulation information is the manipulation command, performing an operation corresponding to the manipulation command; when the manipulation information is the gesture feature data, analyzing the gesture feature data to obtain the manipulation command, and performing an operation corresponding to the manipulation command.

4. The method according to claim 1, further comprising: establishing, by the controlled device, a connection with the gesture control center, and implementing, by the gesture control center based on the connection, manipulation of the controlled device through a session using a message.

5. A gesture control apparatus, comprising a video collection module, an identification module, a control module, a distance measuring module, and a data storage module,
wherein the distance measuring module is configured to identify, along with the video collection module, a controlled device within a visible range and calculate a distance between the apparatus and the controlled device,
wherein the data storage module is configured to, upon identification of the controlled device within the visible range, record a device position of the controlled device,
wherein the video collection module is configured to capture a gesture for the controlled device,
wherein the identification module is configured to identify the gesture, and the identification module comprises an image identification module and a gesture identification module,
wherein the image identification module is configured to identify a manipulation command corresponding to the gesture, and
wherein the gesture identification module is configured to identify a controlled device to which the gesture directs,
wherein the gesture identification module is further configured to, when identifying the controlled device to which the gesture directs,
calculate the direction of the gesture using an angle between the gesture and the video collection module; or
after measurement of distances between the gesture, the controlled device and the apparatus, calculate the direction of the gesture using trigonometric formulas,
wherein the gesture identification module is further configured to, when identifying the controlled device to which the gesture directs, after measurement of distances between the gesture, the controlled device and the apparatus,
calculate an angle between a line from a palm to an elbow and a line from the palm to each controlled device; and
select a controlled device about which the angle is smallest as the controlled device to which the gesture directs, and
wherein the control module is configured to transmit manipulation information corresponding to the gesture to the controlled device.

6. The apparatus according to claim 5, wherein the data storage module is further configured to, upon identification of the controlled device within the visible range, record at least one of a device identifier or a device address of the controlled device.

7. The apparatus according to claim 5, wherein the control module is further configured to, when transmitting the manipulation information, transmit a manipulation command or gesture feature data.

8. The apparatus according to claim 5, further comprising: a network service module configured to establish a connection with the controlled device, and implement, based on the connection, manipulation of the controlled device through a session using a message.

* * * * *